HANOVER & BAILEY.
Cultivator.
No. 79,344.  Patented June 30, 1868.
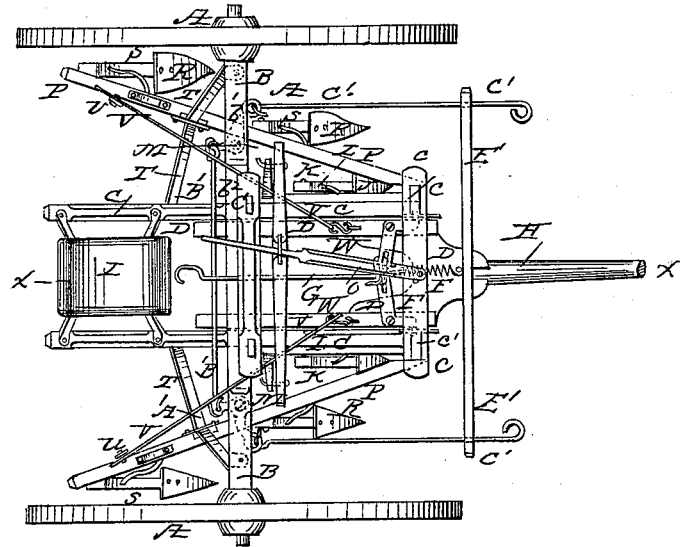
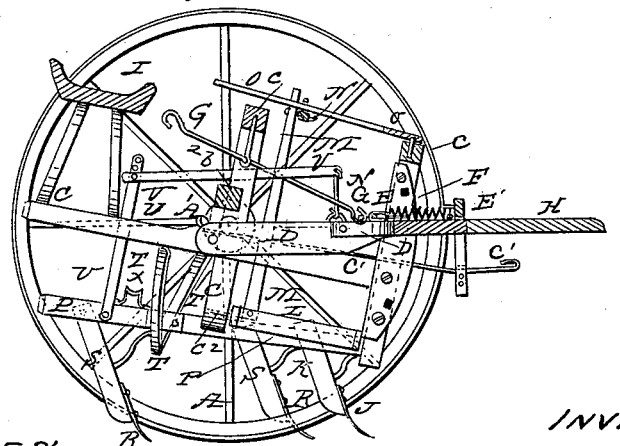

United States Patent Office.

MAJOR E. HANOVER AND DAVID D. BAILEY, OF LAMOILLE, ILLINOIS.

*Letters Patent No. 79,344, dated June 30, 1868.*

IMPROVEMENT IN CULTIVATORS.

*The Schedule referred to in these Letters Patent and making part of the same.*

TO ALL WHOM IT MAY CONCERN:

Be it known that we, MAJOR E. HANOVER and DAVID D. BAILEY, of Lamoille, in the county of Bureau, and State of Illinois, have invented a new and useful Improvement in Cultivators; and we do hereby declare that the following is a full, clear, and exact description thereof, which will enable those skilled in the art to make and use the same, reference being had to the accompanying drawings, forming part of this specification, in which—

Figure 1 is a top view of our improved cultivator.

Figure 2 is a vertical longitudinal section of the same, taken through the line $x$ $x$, fig. 1.

Similar letters of reference indicate corresponding parts.

Our invention has for its object to furnish an improved cultivator, easily and quickly adjusted, and effective in operation.

And it consists in the combination and arrangement of the various parts of the machine, as hereinafter more fully described.

A are the wheels of the cultivator.

B is the axle, the middle part of which is raised up.

This may be done by making the axle B in three parts, $b^1$ and $b^2$, the ends of the middle part $b^2$ resting upon and being secured to the ends of the end parts $b^1$, so that the plants being cultivated may pass beneath the said axle without danger of being broken.

C is a frame, which is rigidly attached to the axle B, and which is so formed that the plants may pass between the vertical parts of the said frame without danger of being broken.

D are the hounds, the rear ends of which are pivoted to the frame C, a little in the rear of the axle B, as shown in figs. 1 and 2.

The forward parts of the hounds D are adjustably secured to the front vertical bars $c^1$ of the frame C by lever-catches or hooks E, the ends of which enter holes formed in the said vertical bars $c^1$, so that the relative positions of the forward part of the frame C and the hounds D may be changed at pleasure, thus regulating the depth at which the plows run in the ground, or lifting said plows entirely out of the ground, as may be desired.

The lever-hooks or catches E are pivoted to the forward part of the hounds D, and their inner ends are slotted and overlap each other, as shown in fig. 1.

F is a coiled spring, the forward end of which is attached to the forward part of the hounds D, and the rear end to the slotted ends of the lever-hooks E, so as to hold the said hooks securely in place while locking the said hounds and frame together.

To the slotted ends of the lever-hooks E is attached the forward end of the connecting-rod G, the rear end of which extends back into such a position as to be readily reached and operated by the driver from his seat.

If desired, the inner sides of the vertical bars $c^1$ may be faced with metal plates, to prevent them from being worn by the action of the lever-hooks E.

H is the tongue, which is attached to the hounds D in the ordinary manner.

I is the driver's seat, which is secured to the rear end of the frame C, as shown in figs. 1 and 2.

J are the inner or forward plows, the standards K of which are secured to the rollers L in such a way that they may be attached to either side of said rollers, according as they may require to be farther apart or nearer together.

The journals of the rollers L work in the lower ends of the vertical bars $c^1$ and $c^2$ of the frame C.

To the outer sides of the rollers L are rigidly attached the lower ends of the bars M, the upper ends of which are adjustably pivoted to the ends of the horizontal bar N, so that by spreading the upper ends of the bars M apart, or drawing them towards each other, the plows J may be moved towards or from each other, according to the distance it is desired to have them apart.

O is a lever, the forward end of which is pivoted to the front cross-bar of the frame C, which passes through a keeper attached to the middle part of the horizontal bar N, and the rear end of which extends back into such a position that it may be conveniently reached and operated by the driver from his seat, so that he may guide the plows J, as desired, in cultivating crooked rows, or avoiding uneven hills.

P are the beams, to which the standards S of the rear and middle plows R are attached.

The forward ends of the beams P are pivoted to the lower ends of the front vertical bars $c^1$ of the frame C, and they extend back obliquely, their rear ends inclining outward, so that the plows R will not follow each other in the same line.

T are angular brace-bars, one end of each of which is attached to the frame C, and their other ends are attached to the axle B, as shown in figs. 1 and 2.

The middle parts of the beams P are slotted, and through the slots thus formed are passed the outer arms of the brace-bars T, to guide the said beams while being moved up and down, to steady them when the plows are working, and to keep them from swinging about while the cultivator is being moved from place to place.

U are connecting-rods, the lower ends of which are pivoted to the rear part of the beams P, and their upper ends are adjustably pivoted to the rear end of the levers V.

The levers V are pivoted to the upper part of the rear vertical bars $c^2$ of the frame C, and their forward ends are connected to the hounds D by the connecting-rods W, as shown in the drawings.

X are foot-rests, attached to the rear part of the beams P.

By this construction and arrangement of parts, the driver, by allowing his weight to rest upon the seat I, and drawing back the lever-hooks E, raises the plows by changing the relative position of the forward parts of the frame C and hounds D. And by allowing his weight to rest upon the beams P, and drawing back said hooks E, the plows may be lowered to any desired distance.

A' are elbow-levers, the angles of which are pivoted to the axle B, and the rear arms of which are connected to each other by the connecting-rod B'.

To the other arms of the bent levers A are pivoted the rear ends of the draught-rods C', which pass forward through slots in the lower ends of the vertical arms D', and to the forward ends of which the horses are attached.

E' is a horizontal bar, the middle part of which is attached to the forward end of the hounds D, and to the ends of which are rigidly attached the upper ends of the arms D', which project downward vertically, and the lower ends of which are slotted for the reception of the draught-rods C', which are adjustably secured in place by pins passing through one or the other of the holes through the said slotted ends of the said arms D', as shown in fig. 2.

This construction and arrangement serve both to equalize the forward draught and to remove the downward draught from the necks of the horses.

We claim as new, and desire to secure by Letters Patent—

1. The frame C, constructed and arranged substantially as herein shown and described, in combination with the axle B, as and for the purpose set forth.

2. The combination and arrangement of the pivoted oblique beams P, connecting-bars U, levers V, and connecting-rods W, with each other, and with the frame C and hounds D, substantially as herein shown and described, and for the purpose set forth.

3. The combination and arrangement of the hounds D, frame C, lever-hooks or catches E, coiled or equivalent spring F, and operating-rod G, with each other, substantially as herein shown and described, and for the purpose set forth.

4. The combination of the angular or bent brace-bars T with the pivoted plow-beam P, axle B, and frame C, substantially as herein shown and described, and for the purpose set forth.

5. The bent levers A', pivoted at their angle-points to the axle B, in combination with the connecting-rod B' in rear of the axle B, draught-rods C', horizontal bar E', hounds D, and slotted vertical arms D', all operating as described for the purpose specified.

MAJOR E. HANOVER,
DAVID D. BAILEY.

Witnesses:
WALTER DOWNING,
C. F. HANOVER.